United States Patent
Brown et al.

(10) Patent No.: US 8,115,150 B2
(45) Date of Patent: Feb. 14, 2012

(54) OPTICAL SUBSTRATE FOR REDUCED BACKGROUND FLUORESCENCE

(75) Inventors: Carl S. Brown, Seattle, WA (US); Steven A. Reese, Shoreline, WA (US)

(73) Assignee: Applied Precision, Inc., Issaquah, WA (US)

( * ) Notice: Subject to any disclaimer, the term of this patent is extended or adjusted under 35 U.S.C. 154(b) by 0 days.

(21) Appl. No.: 12/346,392

(22) Filed: Dec. 30, 2008

(65) Prior Publication Data

US 2009/0206238 A1    Aug. 20, 2009

Related U.S. Application Data

(60) Provisional application No. 61/018,657, filed on Jan. 2, 2008.

(51) Int. Cl.
*H01J 3/14* (2006.01)
(52) U.S. Cl. .................................... 250/201.3; 356/317
(58) Field of Classification Search ............... 250/201.3; 356/317
See application file for complete search history.

(56) References Cited

U.S. PATENT DOCUMENTS

| 5,355,215 A | 10/1994 | Schroeder |
| 2004/0027659 A1 | 2/2004 | Messerschmidt |

*Primary Examiner* — Seung C Sohn

(57) ABSTRACT

A new optical substrate design allows a target to be illuminated with minimal illumination of undesired surfaces within the image collection ray path. The non rectangular substrate provide different surfaces through which a target is illuminated and imaged and thereby prevents illumination rays from crossing the substrate surface through which the target is imaged

20 Claims, 5 Drawing Sheets

OPTICAL SUBSTRATE FOR REDUCED BACKGROUND FLUORESCENCE

CROSS-REFERENCE TO RELATED APPLICATIONS

The present Application claims priority from U.S. Provisional Patent Application No. 61/018,657 filed Jan. 2, 2008, entitled "Optical Substrate For Reduced Background Flourescence," which is incorporated by reference herein in its entirety.

BACKGROUND OF THE INVENTION

1. Field of the Invention

Aspects of the present invention relate generally to the field of microscopy and, more specifically, to methods and apparatuses for reducing background fluorescence in fluorescence microscopy.

2. Description of Related Art

The most common form of fluorescence microscope is an epifluorescence microscope. In this context, "epifluorescence" generally implies that the incidence illumination comes from the same direction or side of the illuminated sample from which fluorescence is detected. Of particular interest is the epifluorescence microscope configuration in which the excitation and the collection or emission beams both pass through the backside of the microscope coverslip, slide, or other optical substrate, upon which the sample being viewed or imaged is located.

A common problem when working with optical substrates, such as glass microscope slides or plastic microtiter plate, is that the backside of the optical substrate becomes contaminated with fluorescent material. Fluorescent contaminants located on the backside of an optical substrate are out of focus relative to the fluorescence of interest and tend to cover or interfere with the fluorescence of interest over a large area. Cleaning fluorescent contaminants from the backside of the optical substrate is very difficult, requiring extra labor and handling of the substrate; increased potential of fouling the sample of interest; slower processing times; and increased costs. In some cases, the fluorescent contaminants are embedded in the surface of the optical substrate and may be impossible to remove using practical, safe solvents and cleaning agents.

In addition to the problem of illuminating out-of-focus contaminants, a second problem lies with background fluorescence arising from the auto-fluorescence of the optical substrate material itself. Even transparent materials such as glass or plastic can produce a detectable amount of fluorescence when the material is thick enough. The fundamental problem is that fluorescence intensity is proportional to the amount of material. Because a typical microscope slide is 1 mm thick, the total thickness of the slide is about two to three orders of magnitude thicker than the target of interest (about 1-10 um thick). From a very simple perspective, the fluorescent probe used to label the target must be at least 300× more fluorescent than the glass in order to achieve a 3:1 signal-to-background ratio. In other words, a large amount of background fluorescence from the substrate will degrade the performance of the instrument by reducing the signal-to-background ratio, which is a critical performance characteristic.

Various microscopy systems and techniques have been employed to reduce or avoid the problems associated with background fluorescence on optical substrates including: laser scanning systems; wide-field imaging systems; evanescent illumination systems; and wide-field systems with oblique illumination. Laser scanning systems have been able to minimize backside problems by illuminating only a single point at a time. The disadvantages of laser scanning systems when attempting to build highly reliable and highly repeatable diagnostic applications are well known. Laser scanning systems are not practical for all types of instruments and have limited ability to perform diagnostic assays.

Wide-field imaging systems that use epifluorescent illumination are the most vulnerable to backside contamination, because the path of the illumination beam exactly matches the path of the image collection optics. The illumination beam passes directly through the backside of the substrate, in the opposite direction of the image collection rays. Similarly, the illumination beam strikes the entire thickness of the substrate on its way to the target.

Evanescent wave illumination is another alternative illumination method. The illumination is directed to the surface of the glass from outside the field-of-view. When illuminated at the so-called "critical angle", the illumination beam will travel through an evanescent wave along the surface of the glass. The strength of this technique is that only objects along the surface of the glass are illuminated. The weaknesses of this technique include: dim, inefficient illumination; many fluorescent probes are not illuminated because the illuminated region is thin; difficult to align and maintain, especially in a commercial instrument; propagation of the illumination is dependent on surface cleanliness; and illumination shadowing will affect fluorescent signal strength. Evanescent illumination has only been practiced in situations involving laboratory research and is not a promising technique for general purpose fluorescence assays.

Wide-field systems with oblique illumination have some ability to avoid illumination of the backside contamination. The illumination beam comes from outside the cone angle of the objective lens. Many of the illumination rays reach the target without passing through the region of the substrate that is viewed by the objective. When using a simple, planar substrate like a microscope slide, however, it is nearly impossible to avoid significant illumination of the substrate. Backside illumination and bulk material illumination can still limit instrument performance. For example, the wide-field, oblique illumination scanner ArraryWoRx, designed and manufactured by Applied Precision, the assignee of the present invention, unavoidably illuminates one or more optical substrate surfaces that are not in the object plane of the scanner. The backside of the target is partially illuminated, causing undesired background fluorescence. To avoid such background fluorescence it is necessary to clean the backside of the scan target or optical substrate. Because the backside surface is part of the object to be scanned, the cleanliness is difficult to control. The quality of the scanned image is overly dependent on the fabricator of the optical substrate and also the instrument operator.

What is needed in the field is a means to eliminate or avoid illumination of out-of-focus surfaces and fluorescent contaminants located on optical substrates.

BRIEF SUMMARY OF THE INVENTION

Certain embodiments of the present invention comprise a unique optical substrate design allows a target to be illuminated with minimal illumination of undesired surfaces within the image collection ray path. A non-rectangular substrate provides different surfaces through which a target is illuminated and imaged, thereby preventing illumination rays from crossing the substrate surface through which the target is imaged.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the present invention provide systems and methods for addressing and resolving the problems associated with background fluorescence of substrates in epifluorescence microscope systems. Certain aspects of the invention provide means for illuminating a fluorescently labeled target while avoiding unnecessary illumination of optical surfaces that are out of the image plane.

Certain embodiments provide a unique substrate shape that allows an illumination beam to reach the target without passing through unnecessary surfaces within the optical system. The thickness and surface angles of the substrate are carefully chosen to provide separate ray paths for both the illumination and collection or emission beams. A non-rectangular substrate allows the illumination to enter the substrate at an angle yielding a number of important advantages, such as: minimal amount of reflection and refraction off the air-substrate interface; reduced backside illumination; maximum illumination efficiency; manageable refraction of the illumination beam; and minimal substrate autofluorescence within the image collection ray path.

Figure 1:
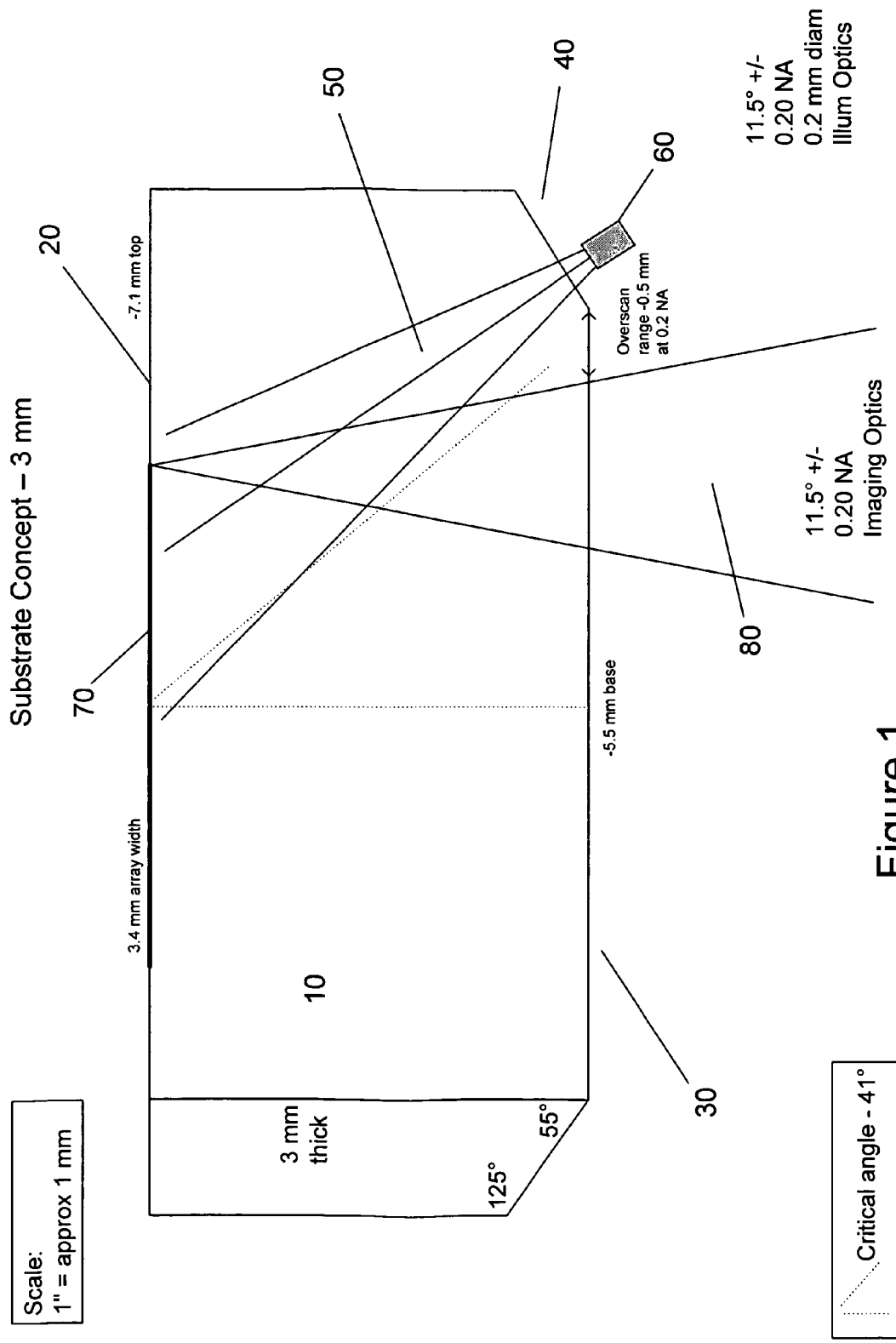
FIG. 1 is an exemplary schematic representation of a cross-section of a three millimeter thick embodiment of the present optical substrate invention.
Figure 2:
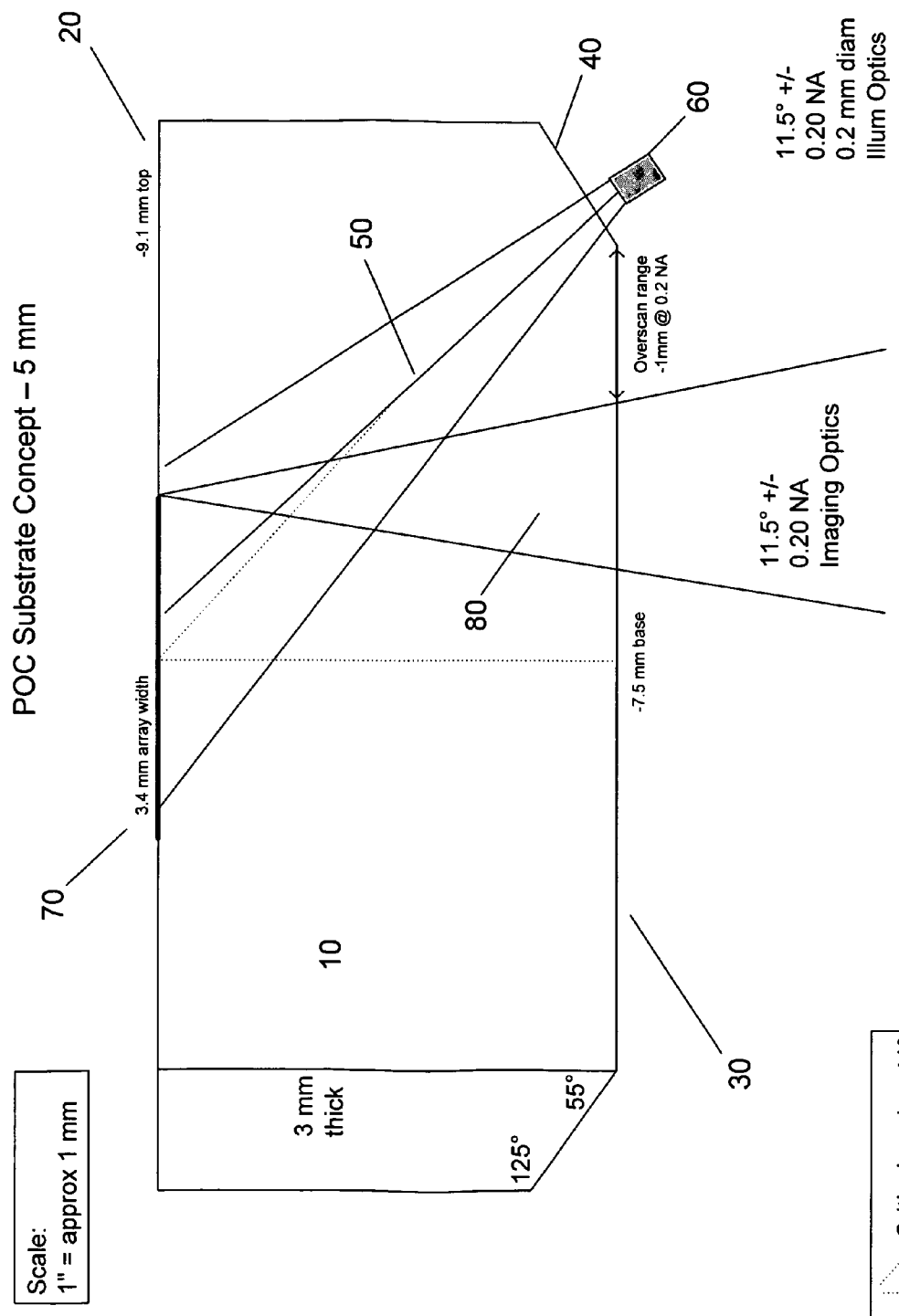
FIG. 2 is an exemplary schematic representation of a cross-section of a five millimeter thick embodiment of the present optical substrate invention.

As shown in FIGS. 1 and 2, in certain embodiments, the present invention may utilize a non-rectangular substrate 10. The substrate may have a flat sample surface 20. An image collection surface 30 oriented approximately parallel to sample surface 20 and an illumination surface 40 at an angle not parallel to either sample surface 20 or image collection surface 30.

In practice, an illumination beam 50 enters the substrate at illumination surface 40. Illumination beam 50 may be incident upon illumination surface 40 at an angle approximately perpendicular to illumination surface 40 or at a non-perpendicular angle as provided by illumination optics 60 of the microscope system being used. The sample of interest or target 70 may be located upon sample surface 20 and positioned in order to receive illumination beam 50. Imaging optics (not shown) may be positioned and configured with respect to the bottom of target 70 and the image collection surface 30 such that the optics may receive fluorescence or excitation rays 80 emitted from target 70.

FIG. 1 shows one example of an embodiment of the invention in which optical substrate 10 is designed to have a depth or thickness of approximately three (3) millimeters and a sample surface 20 width of approximately 7.1 millimeters. Illumination optics 60 may have a 0.20 numerical aperture lens emitting illumination beam 50. Illumination optics 60 may be oriented substantially perpendicular to illumination surface 40. Target 70 is 3.4 millimeters wide and represented by the dark horizontal line across top of sample surface 20. The overall shape of optical substrate 10 may be described as non-rectangular due the angle and orientation of illumination surface 40 which appear as cut corners. FIG. 2 shows an example of an embodiment in which the thickness of optical substrate 10 is five (5) millimeters. The additional thickness of optical substrate 10 may provide greater xy tolerance of the substrate and target 70.

As shown in FIG. 1, the cut corner configuration may be implemented on one or more sides of optical substrate 10. A multisided, cut corner configuration may enable imaging or scanning of target 70 from various perspectives and may facilitate imaging of an entire target in a manner that would not otherwise be possible from a single side.

In addition to the example configurations depicted in FIGS. 1 and 2, a variety of other combinations of substrate thickness, corner angle, substrate geometry, illumination geometry and imaging geometry are possible. Careful selection of the substrate geometry, illumination cone angle, and image collection angle may provide for customization and optimization of the present invention to a variety of fluorescence microscopy systems.

Figure 3:
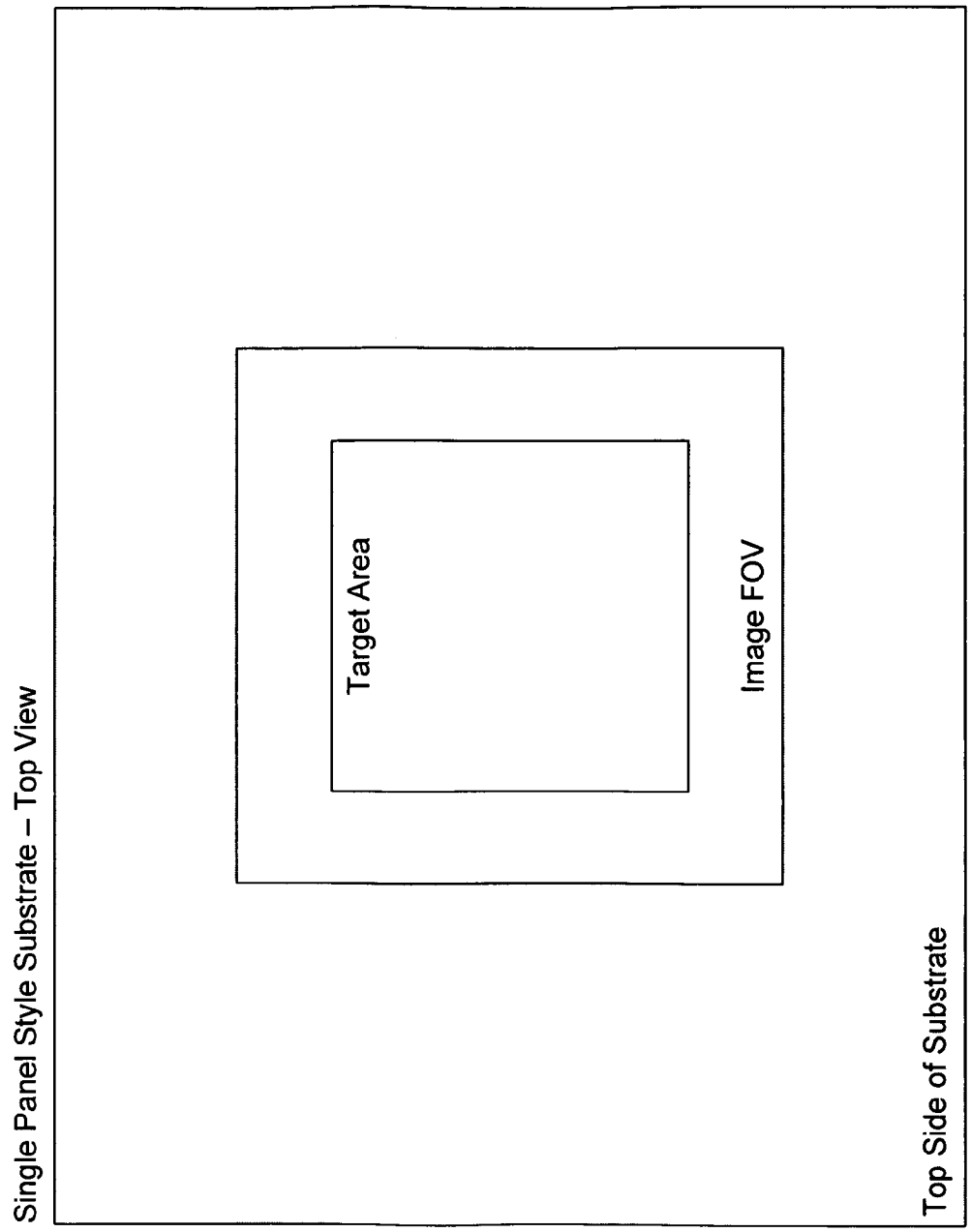
FIG. 3 is an exemplary schematic representation of the top side of a single panel embodiment of the present optical substrate invention.

Certain embodiments may be implemented with a shape that is compatible with either a "single panel" or "stripe" style imaging method. In the single panel style, shown in FIG. 3, the aspect ratio of the width and height of the target corresponds to the aspect ratio of the region-of-interest used on the electronic image sensor. By design, the field-of-view of a single image acquired by the image sensor is typically large enough to gather information about the entire target. The single panel style substrate may also have approximately the same width and height as the target area, when viewed from the above.

Figure 4:
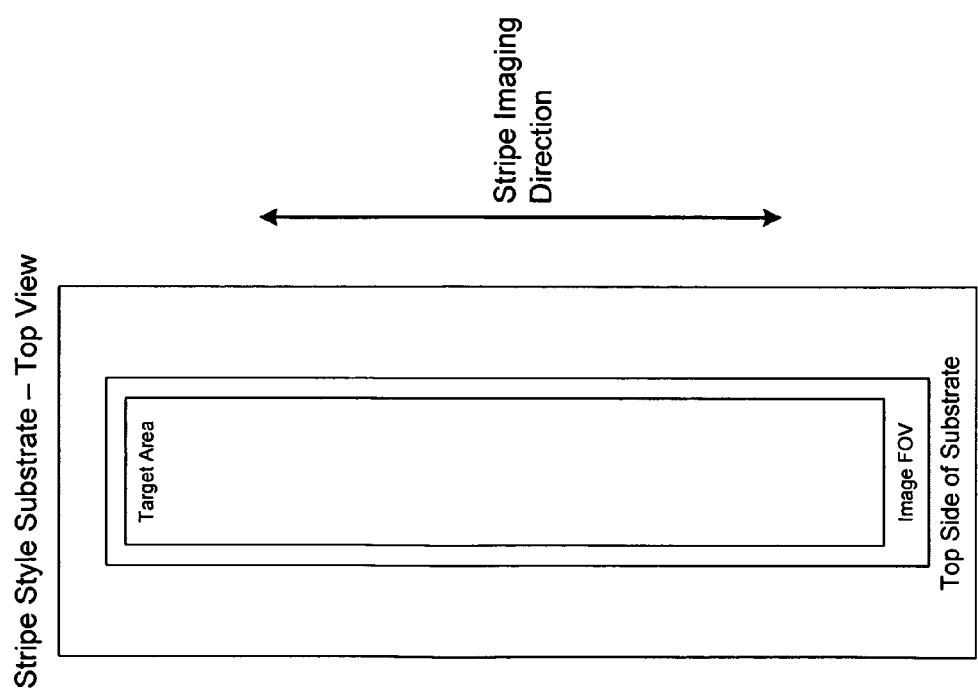
FIG. 4 is an exemplary schematic representation of the top side of a stripe-style panel embodiment of the present optical substrate invention.

The stripe imaging configuration, shown in FIG. 4, takes advantage of a special camera readout method referred to herein as "time delay integration" or "TDI." A TDI method is described in U.S. patent application Ser. No. 11/2202,745 which is commonly owned with the present application and which is herein incorporated by reference in its entirety. In the stripe imaging configuration, the height or width of the substrate and target region is elongated. The benefit of such a configuration is that the size of the target region can be extended indefinitely. The cross-section of the single panel style substrate is essentially extruded along the stripe imaging direction.

Figure 5:
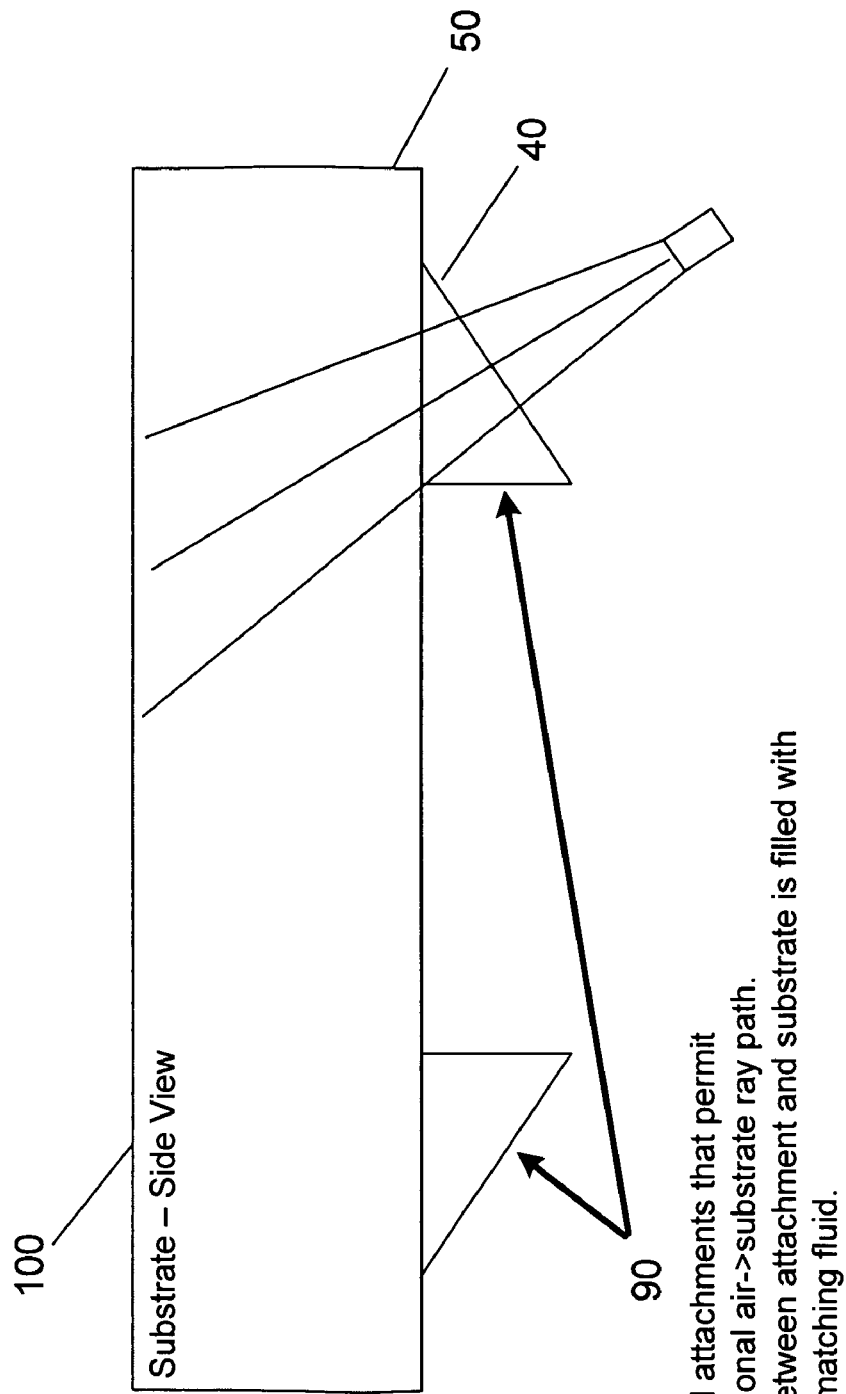
FIG. 5 is an exemplary schematic representation of a cross-section of an optical substrate attachment embodiment of the present invention.

In certain embodiments, optimization of the illumination ray path through the substrate is achieved with a conventional substrate, such as a microscope slide, by utilizing an appropriately configured optical substrate attachment. As shown in FIG. 5, illumination beam 50 is incident upon an optical substrate attachment 90 at illumination surface 40. Optical substrate attachment 90 further comprises optical substrate attachment surface 110 which may be positioned proximate to conventional substrate 100. Illumination beam 50 may pass through optical substrate attachment 90 and enter conventional substrate 100 in the same manner and imparting the same advantages as described for the embodiments described in FIGS. 1 and 2. In other words, in this configuration, it remains possible to illuminate a target without illumination beam 50 crossing an image collection surface.

The material used to fabricate optical substrate attachment may be selected to have a similar index of refraction as that of the conventional substrate, so as to minimize refraction between the attachment and the substrate. To improve transmission and reduce undesired scattering, an index matching fluid or adhesive material may be used between the attachment and the substrate. In practice, optical substrate attachment 90 may take various forms including: a hollow ring, a strip, a solid trapezoid or other appropriate geometry. In this embodiment the image collection surface may be the backside of the conventional substrate or a surface of the optical substrate attachment.

It will be understood that various modifications may be made without departing from the spirit and scope of the invention. Accordingly, other embodiments are within the scope of the claimed invention.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide an optical substrate comprising a sample surface, an image collection surface substantially parallel to the sample surface, and an illumination surface positioned non-parallel to the image collection surface. In some of these embodiments, the optical substrate comprises one or more illumination surfaces. In some of these embodiments, the optical substrate comprises glass. In some of these embodiments, the optical substrate comprises plastic.

Certain embodiments of the invention provide a method of imaging a sample, the method comprising positioning a sample on a sample surface of an optical substrate, illuminating the sample with an illumination beam incident upon an illumination surface wherein the illumination surface is positioned non-parallel to the sample surface and imaging the sample through an image collection surface oriented substantially parallel to the sample surface. In some of these embodiments, the illumination comprises illuminating the sample through one or more the illumination surfaces. In some of these embodiments, the imaging employs time delay integration. Certain embodiments of the invention provide an optical substrate attachment comprising an optical substrate attachment surface and an illumination surface positioned non-parallel to the optical substrate attachment surface. In some of these embodiments, the optical substrate attachment comprises one or more of the illumination surfaces. In some of these embodiments, the optical substrate attachment comprises glass. In some of these embodiments, the optical substrate attachment comprises plastic.

Certain embodiments of the invention provide a method of imaging a sample comprising positioning an optical substrate proximate to an optical substrate attachment surface, providing an illumination beam to an optical substrate attachment illumination surface wherein the illumination surface is non-parallel to the substrate attachment surface and imaging the sample through an image collection surface oriented substantially parallel to the substrate attachment surface. In some of these embodiments, the illumination beam is provided to one or more the illumination surfaces. In some of these embodiments, the imaging employs time delay integration.

Certain embodiments of the invention provide an optical substrate. In some of these embodiments, the optical surface comprises a sample surface, an image collection surface substantially parallel to the sample surface and an illumination surface positioned non-parallel to the image collection surface. In some of these embodiments, the optical substrate is a non-rectangular optical substrate. In some of these embodiments, the optical substrate comprises a plurality of illumination surfaces positioned non-parallel to the image collection surface. In some of these embodiments, each of the plurality of illumination surfaces is non-parallel to the sample surface. In some of these embodiments, the sample surface is substantially flat. In some of these embodiments, the optical substrate comprises glass and/or plastic. Some of these embodiments further comprise an optical substrate attachment. In some of these embodiments, the form of the optical substrate attachment comprises one or more of a hollow ring element, a strip element or a solid trapezoidal element. In some of these embodiments, the thickness of the optical substrate is about three millimeters. In some of these embodiments, the thickness of the sample surface is about 7.1 millimeters. In some of these embodiments, the thickness of the optical substrate is about five millimeters.

Certain embodiments of the invention provide methods for imaging a sample. Some of these embodiments comprise positioning a sample on a sample surface of an optical substrate, illuminating the sample with an illumination beam incident upon an illumination surface, wherein the illumination surface is positioned non-parallel to the sample surface and imaging the sample through an image collection surface oriented substantially parallel to the sample surface. In some of these embodiments, the optical substrate comprises an optical substrate attachment surface and the illumination surface includes an optical substrate attachment illumination surface. In some of these embodiments, the illumination comprises illuminating the sample through one or more of the illumination surfaces. In some of these embodiments, the imaging step includes using time delay integration.

Certain embodiments of the invention provide optical substrate attachments. Some of these embodiments comprise an optical substrate attachment surface aligned with a first plane and an illumination surface aligned with a second plane that is unaligned with the first plane. Some of these embodiments further comprise one or more additional illumination surfaces, each of the additional illumination surfaces is aligned with a plane unaligned with the first plane. In some of these embodiments, the optical substrate attachment comprises glass and/or plastic.

Certain embodiments of the invention provide a non-rectangular optical substrate. Some of these embodiments comprise a flat sample surface, an image collection surface oriented approximately parallel to the sample surface, and one or more illumination surfaces at an angle not parallel to either the sample surface or the image collection surface. In some of these embodiments, the thickness of the optical substrate is approximately three millimeters. In some of these embodiments, the thickness of the sample surface is approximately 7.1 millimeters. In some of these embodiments, the thickness of the optical substrate is approximately five millimeters. Some of these embodiments further comprise an optical substrate attachment. In some of these embodiments, the optical substrate attachment is in the form of a hollow ring, a strip, or a solid trapezoid. In some of these embodiments, the optical substrate comprises glass. In some of these embodiments, the optical substrate comprises plastic.

Certain embodiments of the invention provide methods for imaging a sample. Some of these embodiments comprise positioning a sample on a sample surface of an optical substrate, illuminating the sample with an illumination beam incident upon an illumination surface, wherein the illumination surface is positioned non-parallel to the sample surface, and imaging the sample through an image collection surface oriented substantially parallel to the sample surface. In some of these embodiments, the illuminating comprises illuminating the sample through one or more illumination surfaces. In some of these embodiments, the imaging comprises time delay integration. In some of these embodiments, the optical substrate further comprises an optical substrate attachment comprising an optical substrate attachment surface and an illumination surface positioned non-parallel to the optical substrate attachment surface. In some of these embodiments, the optical substrate attachment comprises one or more illumination surfaces. In some of these embodiments, the optical substrate attachment comprises glass and/or plastic.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. An optical substrate comprising:
    a sample surface;
    an image collection surface substantially parallel to the sample surface; and
    an illumination surface positioned non-parallel to the image collection surface.

2. The optical substrate of claim 1, wherein the optical substrate is a non-rectangular optical substrate.

3. The optical substrate of claim 1, wherein the optical substrate comprises a plurality of illumination surfaces positioned non-parallel to the image collection surface.

4. The optical substrate of claim 3, wherein each of the plurality of illumination surfaces is non-parallel to the sample surface.

5. The optical substrate of claim 1, wherein the sample surface is substantially flat.

6. The optical substrate of claim 1, wherein the optical substrate comprises glass.

7. The optical substrate of claim 1, wherein the optical substrate comprises plastic.

8. The optical substrate of claim 1, further comprising an optical substrate attachment.

9. The optical substrate of claim 8, wherein the form of the optical substrate attachment comprises one or more of a hollow ring element, a strip element or a solid trapezoidal element.

10. The optical substrate of claim 1, wherein the thickness of the optical substrate is about three millimeters.

11. The optical substrate of claim 1, wherein the thickness of the sample surface is about 7.1 millimeters.

12. The optical substrate of claim 1, wherein the thickness of the optical substrate is about five millimeters.

13. A method of imaging a sample comprising:
    positioning a sample on a sample surface of an optical substrate;
    illuminating the sample with an illumination beam incident upon an illumination surface, wherein the illumination surface is positioned non-parallel to the sample surface; and
    imaging the sample through an image collection surface oriented substantially parallel to the sample surface.

14. The method of claim 13, wherein the optical substrate comprises an optical substrate attachment, surface and the. illumination surface includes an optical substrate attachment illumination surface.

15. The method of claim 13, wherein the illumination comprises illuminating the sample through one or more of the illumination surfaces.

16. The method of claim 13, wherein the imaging step includes using time delay integration.

17. An optical substrate attachment comprising:
    an optical substrate attachment surface aligned with a first plane; and
    an illumination surface aligned with a second plane that is unaligned with the first plane.

18. The optical substrate attachment of claim 17, further comprising one or more additional illumination surfaces, each of the additional illumination surfaces is aligned with a plane unaligned with the first plane.

19. The optical substrate attachment of claim 17, wherein the optical substrate attachment comprises glass.

20. The optical substrate attachment of claim 17, wherein the optical substrate attachment comprises plastic.

* * * * *